(12) United States Patent
Bogardus et al.

(10) Patent No.: US 12,076,768 B2
(45) Date of Patent: Sep. 3, 2024

(54) REMEDIATING COMPOSITION

(71) Applicants: Timothy J. Bogardus, Granger, IA (US); Joseph F. St. Pierre, Racine, WI (US)

(72) Inventors: Timothy J. Bogardus, Granger, IA (US); Joseph F. St. Pierre, Racine, WI (US)

(73) Assignee: WOLVERINE ENVIRONMENTAL, LLC, Granger, IA (US)

(*) Notice: Subject to any disclaimer, the term of this patent is extended or adjusted under 35 U.S.C. 154(b) by 505 days.

(21) Appl. No.: 16/820,876

(22) Filed: Mar. 17, 2020

(65) Prior Publication Data

US 2020/0398322 A1 Dec. 24, 2020

Related U.S. Application Data

(60) Provisional application No. 62/864,955, filed on Jun. 21, 2019.

(51) Int. Cl.
 *B09B 3/10* (2022.01)
 *B09C 1/08* (2006.01)

(52) U.S. Cl.
 CPC .................................... *B09C 1/08* (2013.01)

(58) Field of Classification Search
 None
 See application file for complete search history.

(56) References Cited

U.S. PATENT DOCUMENTS 4,621,011 A * 11/1986 Fleischer .................. C08L 1/02
 428/221
2011/0176871 A1* 7/2011 St. Pierre ................. B01J 20/24
 405/128.7

FOREIGN PATENT DOCUMENTS

KR 20120091522 * 8/2012

OTHER PUBLICATIONS

Zhao, Shiyang, et al. "Larger Resin Ducts are Linked to the Survival of Lodgepole Pine Trees. .". Frontiers in Plant Science. Nov. 2019. (Year: 2019).*
Merriam-Webster. Grist. 2022. (Year: 2022).*
Iglesias, Maria et al. "Pulping Processes . . . ". Forest Products Journal. vol. 70. No. Dec. 1, 2020. (Year: 2020).*
Pine Chemistry. https://arboris-us.com/evergreen-solutions/pine-chemistry/ (2023). (Year: 2023).*
Shin et al., The Development of Bio-Carbon Adsorbents From Lodgepole Pine to Remediate Acid Mine Drainage in the Rocky Mountains, Journal, Mar. 2008, pp. 267-276, vol. 32 Issue 3, Biomass and Bioenergy.

* cited by examiner

*Primary Examiner* — Sheng H Davis
(74) *Attorney, Agent, or Firm* — BrownWinick Law Firm; David M. Breiner (57) ABSTRACT

The present invention comprises a method of making and using a remediating composition for remediating contamination resulting from improper use or handling, or natural causes that would otherwise be damaging to, for example, the environment. Sources of contaminants include petroleum products, chemical and nuclear waste spills, biotoxin blooms, or combinations thereof. The method comprises allowing a heat-dried, particulate remediating composition to contact an amount of contaminated material for a time adequate to reduce the level of the contaminant in the contaminated material. Thereafter, testing of the previously contaminated material shows measurably lower amounts (often below measurable levels) of the contaminant, resulting in "decontaminated material". Further, testing the newly-contaminated remediating composition shows far lower levels of the contaminants than would be expected when taking into account the original amounts of contaminants and remediating composition, and the amount remaining in the now-decontaminated material. The remediating composition remediates (reverses or stops) environmental damage.

20 Claims, 8 Drawing Sheets

REMEDIATING COMPOSITION

CROSS REFERENCE TO RELATED APPLICATION

This application claims priority to U.S. Provisional Application No. 62/864,955 which was filed on Jun. 21, 2019, the entirety of which is incorporated herein fully by reference.

BACKGROUND OF THE INVENTION

Field of the Invention

This invention relates to decontamination tools and methods. More particularly, it relates to an inventive remediating composition. The inventive composition may be used to remediate the potentially harmful effects of certain byproducts of nuclear power production, petroleum production, and the use of chemical products. The inventive remediating composition is, surprisingly comprised of natural materials.

General Background

For centuries, people have used plants and trees as housing, weapons, clothing, and food. Humans have learned much about the usefulness of certain plants and trees, and are continuing to understand more completely how to use them. Plants provide fibers for making cloth, rope, paper etc. Plants provide specific nutrients not available from animal sources of food. Various plants have served as, or been employed in, detergents, paints, and other products. Many plants, their extracts, or specific components have been employed medicinally, as well as industrially. Various parts of certain plants are now understood to be medicinal in nature, addressing different disease states and producing different effects. As an example, *A. annua* was traditionally used in ancient Chinese medicine as a fever reducer. More recently it has been studied for anti-malarial and anti-cancer treatments. Another example of a useful plant is Catnip as a source of essential oils. And, it has recently been discovered that grape-derived polyphenols play protective roles in Alzheimer's disease. Research indicates that the key to the multiple uses of plants for medicinal and many other purposes is the variety of chemicals produced in or by the plant. This variety may change during the plant's stages of growth and maturation. Further, different parts of the same plant may include profiles of chemicals that differ from the other partys of the same plant. The natural blend of these chemicals is often affected by the soil or climate in which it grows, or stresses in the plant's environment. In trees, some of those unique chemical combinations lend specific character to the resin, the wood, and/or the leaves.

Human activities such as drilling for and refinement of petroleum, creation and use of chemical products, and the production of nuclear power have propelled society and civilization forward in many ways. Humans have used petroleum (or oil) for decades in power production and weapons of war. Its use surged during the Industrial Revolution—where oil became valuable as both a fuel for illumination and a lubricant-before it became a replacement for wood, coal, animal power, and other sources of energy. But, the use of petroleum products and chemicals also have negative effects in the form of pollution and other unintended consequences of their use.

Contaminated sites pose significant risk to humans and the environment. Many different remediation technologies have been developed throughout the years to mitigate risks imposed by soil and water contamination; some are contaminant specific; some are site specific. Remediation may include contaminant removal from soil or water or air, contaminated soil removal, or contaminated water removal; it may include containment and stabilization measures; even transformation is sometimes employed.

Environmental contamination by an unwanted substance is not a new problem. Contamination of the environment has become of ever-increasing importance in the most recent decades. Further, the range of possible contaminating substances has widened measurably as new uses of old materials are developed, and new combinations of chemicals, electrical power, nuclear reactions, and chemical reactions are studied and used for various purposes.

Among the most egregious contributors of known contaminants are both the processes used by and the products produced by the nuclear power and petroleum industries.

As oil use boomed in the middle part of this century, its refined products (such as gasoline and diesel) came to be used to fuel automobiles, and other vehicles, and a worldwide system of wells, ships, storage terminals, and pipelines grew. Equipment used in this industry has aged. The combination of aging equipment, ever-increasing needs for transportation of the products, human error, and bad luck, has resulted in occasional releases of oil into the environment. The largest spills have released tens of millions of gallons of oil and have resulted in fouled coastlines, polluted fisheries, dead and injured wildlife, lost tourism revenue, and millions of dollars spent to ameliorate the resulting problems.

In 1978 the Amoco Cadiz, loaded with almost 69 million gallons of light crude oil, ran aground on shallow rocks off the coast of Brittany, France, on the morning of Mar. 16, 1978. Rescue tugs attempted to secure towlines to the Cadiz, but the lines did not hold. The Cadizan aground near the Brittany coast. The container tanks released the oil and about 200 miles (321 km) of French coast was polluted killing mollusks, birds, and contaminating other habitats. Amoco Corporation later agreed to pay $120 million to French claimants.

In August 1983 a fire caused the Castillo de Bellver tanker to capsize in the South Atlantic Ocean. The tanker broke into two pieces; its stem section, which contained some 110,000 tons of oil, drifted to within 24 miles of the coast before it sank in deep water. The majority of the oil released was carried out to sea before it dispersed.

The largest accidental oil spill in history occurred in the Gulf of Mexico on Apr. 20, 2010. A surge of natural gas blasted through a cement well cap installed to seal a well drilled by the Deepwater Horizon oil platform. Thereafter some 134 million gallons of oil were released (according to the findings of the U.S. District Court), and about 2,100 km (1,300 miles) of the U.S. Gulf Coast from Texas to Florida were coated with oil.

The impact of nuclear accidents has been a topic of debate since the first nuclear reactors were constructed in 1954, and has been a key factor in public concern about nuclear facilities. There have been more than 100 serious nuclear accidents and incidents from the use of nuclear power, about 60 accidents since the Chernobyl disaster and a half dozen nuclear-powered submarine accidents since 1961. About half of all nuclear-related accidents have occurred in the USA.

Pollutants in the form of nuclear waste could eclipse the results of petroleum-related spills. Example outcomes include lethal effects to individuals, radioactive isotope release to the environment, or reactor core melt.

Yet, these are not the only polluting sectors of industry. Further problem materials include byproducts of pharmaceutical production and other manufacturing which also pollute bodies of fresh water as well as land resources. As these various contaminants become better understood, scientists and environmental protection agencies raise the alarm in new efforts to curb or eliminate the use or release of known, harmful, contaminants. And, clearly, there remains a need for better methods and materials to remediate contamination.

DESCRIPTION OF THE PRIOR ART

Remediation techniques which have been commonly used to remediate chemical and other contamination of soil or water include: containment, pump-and-treat, extraction, stabilization/solidification, soil washing, air stripping, precipitation, vitrification, thermal desorption and biological remediation.

Traditionally, there are three main soil remediation technologies: soil washing, bioremediation and thermal desorption. Soil washing is a process that uses surfactants and water to remove contaminants from the soil. Bioremediation uses microorganisms to degrade organic contaminants in soil Groundwater remediation. The most basic type of groundwater remediation, uses air to strip water clean (air sparging). Another method, called pump and treat, physically removes the water from the ground and treats it by way of biological or chemical means; then returns the sanitized water. Bioremediation may be employed, injecting into the water or otherwise including microorganisms to degrade organic contaminants. These methods have proven successful in treating contaminated groundwater.

Alternatively, Chemical Remediation may be employed. There are two main types of chemical remediation: ISCO Remediation and ISCR Remediation.

ISCO (in situ chemical oxidation) is an in situ technology appropriate for soil or groundwater remediation and is applied by injecting chemical oxidants into the contaminated area. The oxidants destroy the contaminants, eliminating the need for removal.

ISCR (in situ chemical reduction) is a type of environmental remediation technique used for soil and/or groundwater remediation to reduce the concentrations of targeted environmental contaminants to acceptable levels. This technique relies on chemical reduction which is one half of a redox reaction, which results in the gain of electrons.

Bioremediation uses microorganisms to degrade organic contaminants in soil, groundwater, sludge and solids.

A wide range of cleanup systems has been developed for mediating contamination by chemical, radiation, and nuclear waste spills. For small oil and some chemical spills on land, the contaminant may be addressed by excavating the contaminated soil and removing it to a secure landfill. Oil spills on water may be localized and contained using floating booms and adsorbents, or solid materials that capture the oil-based contaminants. In either case, the now-contaminated clean-up materials may be disposed of in landfills. While these efforts are certainly better than no efforts, there is much room for improvement in tools and materials for use in contaminant cleanup. Further, the landfill deposit housing the now-contaminated clean-up materials still comprises the contamination removed from the site of the spill, again simply transporting the problem, rather than remediating it.

Chemical spills represent potentially very large environmental problems from a wide range of chemicals. Emergency response procedures developed by environmental scientists and engineers to deal with chemical spills are improving. Newer, more innovative methods for cleanup of contaminated materials include bioremediation (using bacteria to metabolize the contaminants) and chemical oxidation (using oxidants, such as hydrogen peroxide and ozone to break the chemicals down). However, while these processes address the immediate need, they, too, often result in sequestering pollutant in the remediation materials; the now-polluted remediation materials must then be disposed of as a hazardous waste. In other words, while we are becoming adept at cleaning up a contaminated area by removing the contaminant to another location, we do not always have an efficient means to remediate the contaminant's effect on the locale to which it is removed. There is, therefore, a need for means to remediate or eliminate one or more of the harmful characteristics of a contaminant to make it safer for disposal. Especially critical is the need for remediating tools that address contamination by chemicals, radiation, and nuclear waste; and there is a need for a biodegradable material which is renewable and relatively inexpensive for use in remediating the aforementioned pollutants.

SUMMARY OF THE INVENTION

The invention addresses a method and composition for remediating contamination by hazardous materials and/or contaminants and/or pollutants (hereafter, "Contaminants"). The term remediate is used here to mean "to restore by reversing or stopping environmental damage". The words contaminants, pollutants, hazardous materials may be used interchangeably herein to indicate a substance in gas, liquid, solid, or mixed forms which potentially may cause harm to the surrounding areas, gases, liquids, solids, and mixtures thereof and, thereafter, harm animal life, plant life or environment. The inventive remediating composition (hereafter, "Remediating Composition") is applied to material that may be described as liquid, solid, granular, gel, or mixtures thereof comprising at least one contaminant (hereafter, "Contaminated Material"), and may also be applied to the Contaminated Material's surroundings.

The spill or mass of Contaminated Material comprises a first amount of at least one Contaminant. Typically, combining the Remediating Composition and the Contaminated Material for the purpose of remediation would be expected to result in sequestering the Contaminant in the Remediating Composition as the natural consequence of absorption or adsorption by the Remediating Composition. One would then expect to be able to test the combination of the Remediating Composition and Contaminant and that the test would detect the level of Contaminant in the Combination to be some approximate indication of the amount of the Contaminant absorbed or adsorbed by the Remediating Composition. Of course, it would be expected that the concentration of the Contaminant would be lowered due to its combination with the mass of the Remediating Composition but, generally, one would believe that most of the Contaminant now absorbed or adsorbed by the Remediating Composition would be physically measurable as an addition to the Remediating Composition and/or would remain chemically separable from the Remediating Composition. It may also be expected that the physical character of the Remediating Composition may be altered, or that the Remediating Composition's chemical makeup may be greatly affected by contact with the Contaminant. It would not, however, be expected that the amount of Contaminant absorbed or adsorbed by the Remediating Composition would be undetectable or far lower than the amount of Contaminant that was removed by contact with, and absorption or adsorption by, the Remediating Composition.

According to the present invention, a method is presented by which Contaminants may be remediated from a Contaminated Material. The method includes use of the inventive Remediating Composition which comprises natural material, namely, lodge pole pine tree material which has been treated with heat, and ground or pelletized. The Remediating Composition is employed to remediate contamination via physical contact, resulting in a Remediated Material. However, unlike the results of using untreated material, upon the passage of sufficient contact time (approximately 5 minutes of contact, however, the time required may vary based on the relative amounts of the Composition and the Contaminated Material, or on the nature of the Contaminated Material) between the Remediating Composition and the Contaminated Material, very little or none of the Contaminant can be separated from or even detected in the combined Contaminated Material and Remediating Composition (hereafter, the "Combination"). In short, testing of the Combination does not detect the Contaminant in amounts that would be expected as a result of simple absorption or adsorption of the Contaminant (or Contaminated Material), instead testing detects the Contaminant in far smaller amounts than expected compared to the original mass of the Contaminant in the Contaminated Material. There is herein presented a method of making the Remediating Composition and using it for remediation of contaminant spills by contacting the Contaminant with the Remediating Composition, and, optionally mixing the released Contaminant (or Contaminated Material) with the Remediating Composition to form a Combination, wherein testing of the Combination indicates the concentration of the Contaminant in the Combination is far less than would be expected as a result of simple mixture, absorption, or adsorption of the pollutant/ Contaminant by the Remediating Composition.

In addition to remediating various contaminants, the Remediating Composition may also be employed as a fire suppression aid as well as an anti-slick or anti-slip agent.

DETAILED DESCRIPTION OF THE PREFERRED EMBODIMENT

Figure 1:
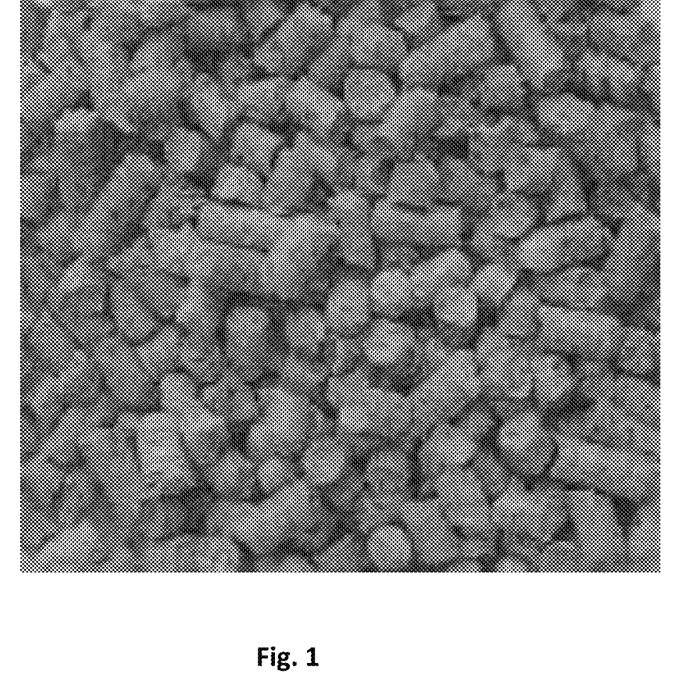
FIG. 1 The Remediating Composition-photo
FIG. 2 The Remediating Composition being hydrated-photo
FIG. 3 The Remediating Composition after expansion-photo
FIG. 4 The Remediating Composition after contamination-photo
FIG. 5 The Remediating Composition longer after contamination-photo
FIG. 6 DRO Remediation graph
FIG. 7 GRO Remediation graph
FIG. 8 Lead Remediation graph
Figure 2:
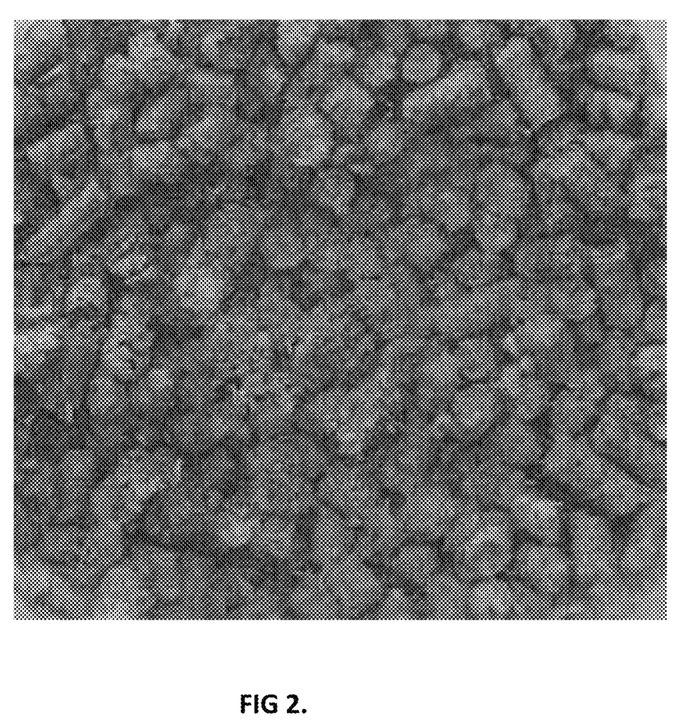
Figure 3:
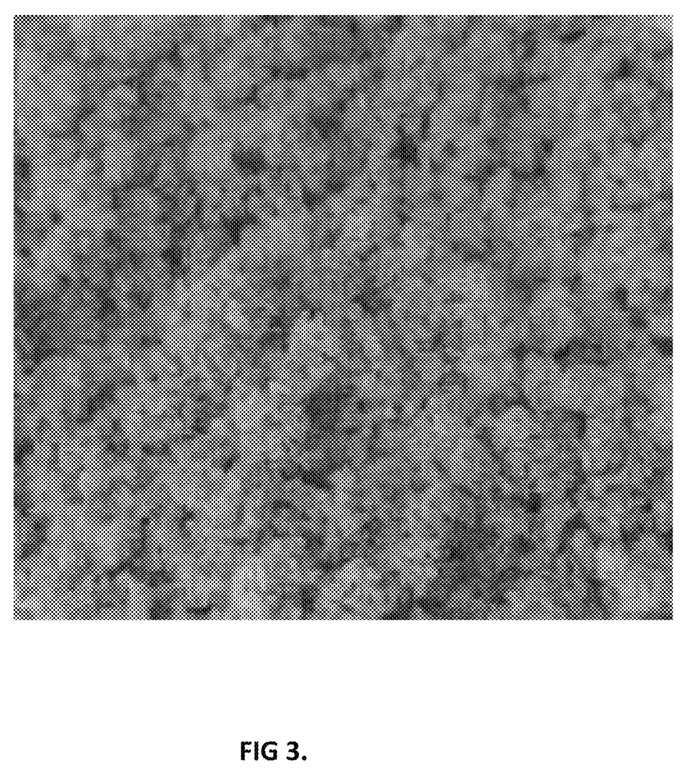
Figure 4:
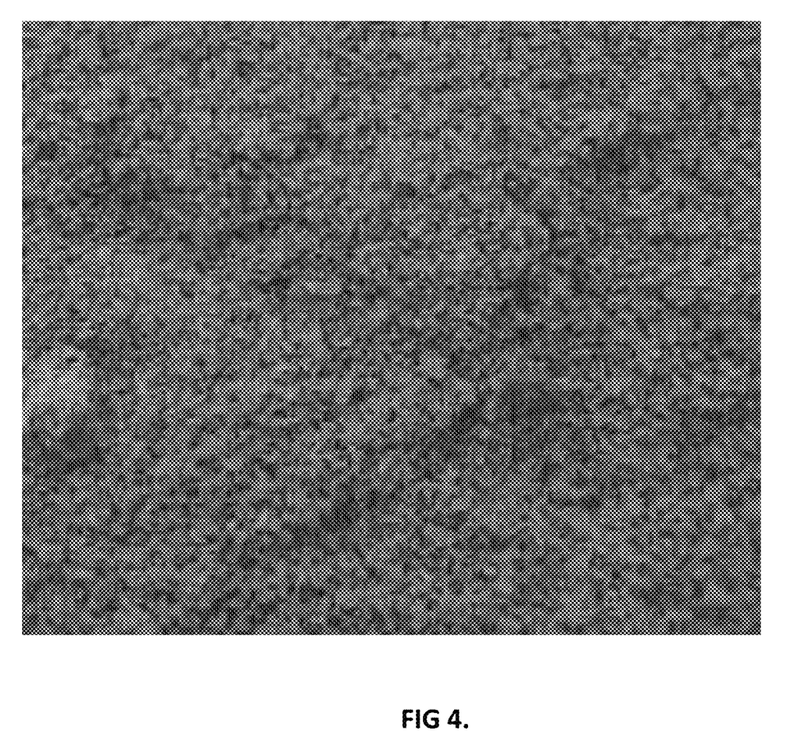
Figure 5:
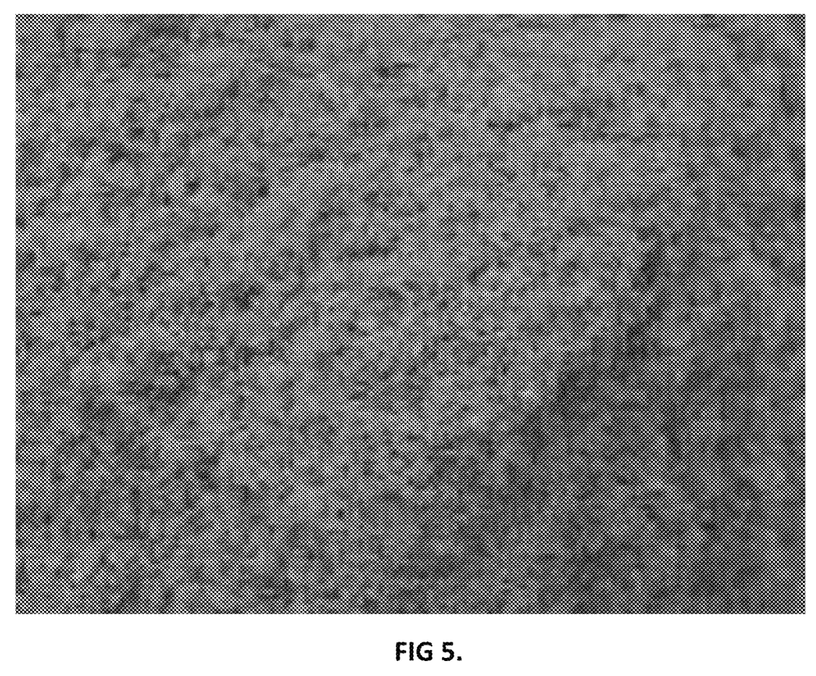
Figure 6:
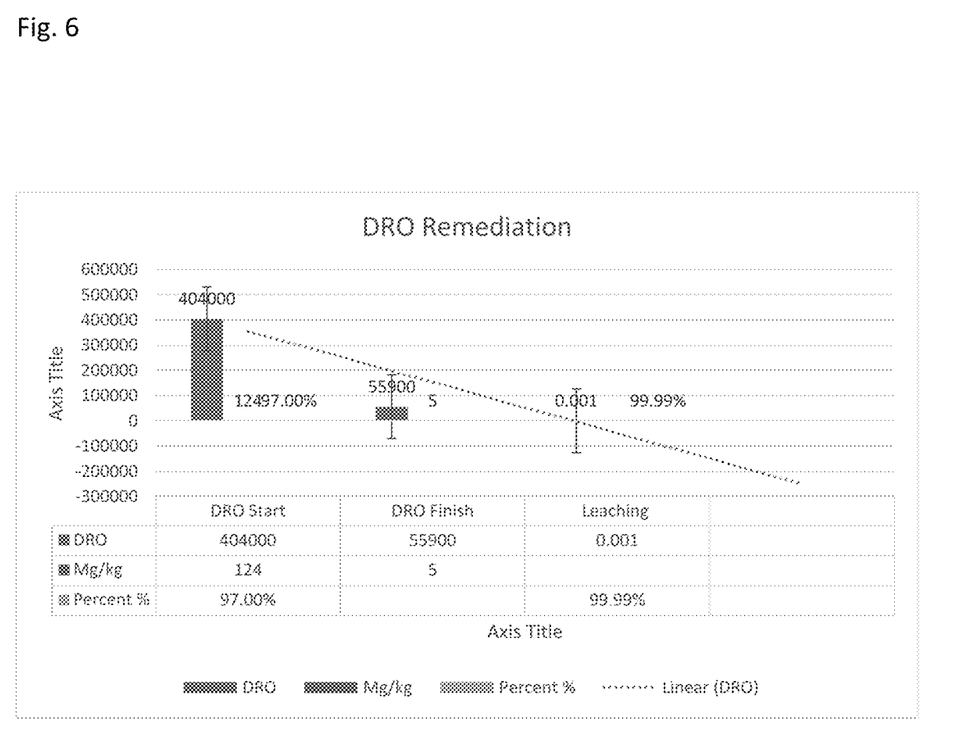
Figure 7:
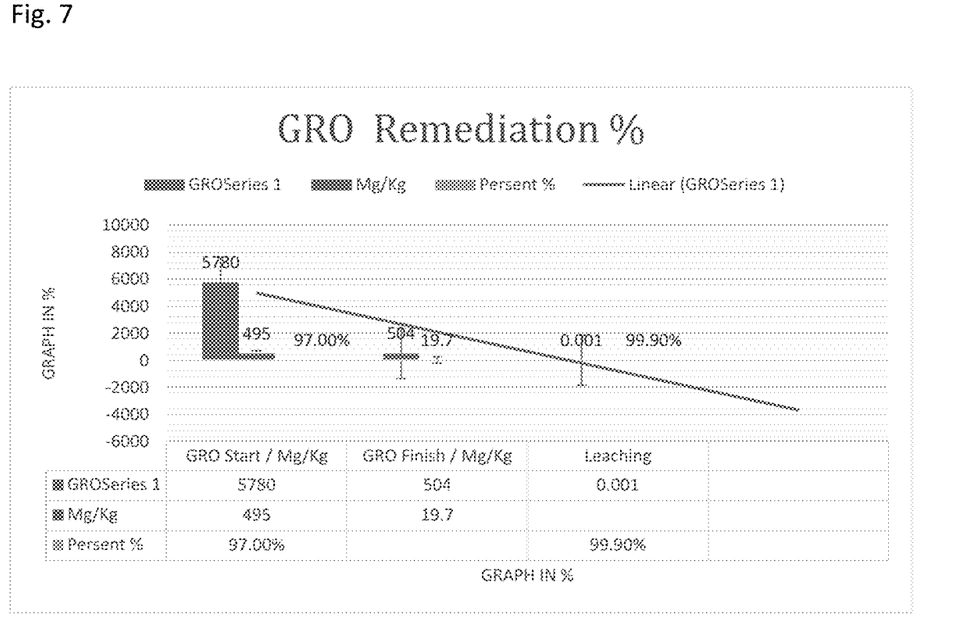
Figure 8:
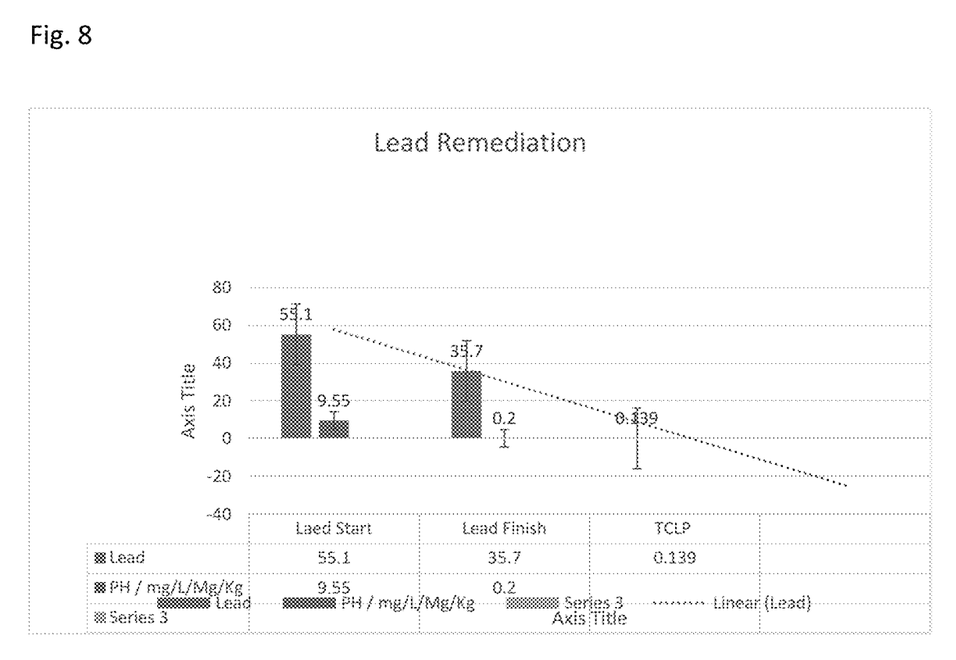

The present invention describes and discloses methods of making and using certain compositions for use in remediating certain polluting materials. Generally, the invention comprises an amount of a Remediating Composition, a contaminated material, and adequate contact time between the Remediating Composition and the contaminated material.

The steps for making the Remediating Composition comprise, generally, grinding a resin-containing tree or trees, thereafter heat drying the ground tree material. Specifically, the resin-containing tree is pine. It may be jack pine, lodge pole pine, or other species. It is preferably live when harvested. It is thought that the makeup of resin in a pine tree of a certain age, including lodge pole pine, may be more beneficial to the claimed use, however, using pine or lodge pole pine of other ages will also provide remediating effects. While other pine species, such as jack pine, exhibit comparable resin profiles and are included as a viable pine source in the present invention, the effectiveness of compositions made using jack pine and in accordance with the disclosure herein is not as effective in remediation as lodgepole pine. Lodgepole pine and jack pine comprise the following resin/terpene profiles:

TABLE 1

Terpenes in Lodgepole and Jack pine trees
Mean content of terpenes (PPM) (±1 SE) of lodgepole and jack pine trees.

| Terpene | P-value | Mean content (ppm) | |
|---|---|---|---|
| | | Lodgepole pine | Jack pine |
| Borneol | P < 0.001 | 14.67 ± 3.18 | 4.18 ± 1.64 |
| Bornyl acetate | P = 0.004 | 45.95 ± 12.55 | 42.52 ± 3.41 |
| Camphene | P < 0.001 | 88.47 ± 8.30 | 30.32 ± 4.51 |
| Camphor | P = 0.041 | 6.69 ± 1.93 | 2.21 ± 0.85 |
| 3-Carene | P < 0.001 | 1738.14 ± 321.80 | 226.99 ± 44.95 |
| α-Caryophyllene | P < 0.001 | 16.02 ± 3.32 | 5.47 ± 2.24 |
| α-Copaene | P < 0.001 | 13.70 ± 2.68 | 1.09 ± 0.78 |
| α-Cubebene | P = 0.273 | 2.50 ± 1.46 | 0.79 ± 0.63 |
| p-Cymene | P < 0.001 | 32.06 ± 5.11 | 2.90 ± 1.71 |
| α-Humulene | P < 0.001 | 42.35 ± 7.30 | 3.19 ± 1.42 |
| Limonene | P < 0.001 | 848.64 ± 164.35 | 203.25 ± 48.89 |
| Linalool | P = 0.220 | 64.73 ± 9.02 | 117.74 ± 16.68 |
| Myrcene | P < 0.001 | 435.45 ± 45.48 | 100.18 ± 15.71 |
| Ocimene | P < 0.001 | 31.75 ± 8.21 | 0.00 ± 0.00 |
| α-Phellandrene | P < 0.001 | 175.77 ± 17.93 | 1.62 ± 1.38 |
| β-Phellandrene | P < 0.001 | 9096.72 ± 960.59 | 157.21 ± 40.39 |
| α-Pinene | P < 0.001 | 949.81 ± 132.72 | 2518.14 ± 328.27 |
| β-Pinene | P < 0.001 | 921.46 ± 127.02 | 283.98 ± 43.68 |
| Pulegone | P = 0.039 | 30.21 ± 6.81 | 107.13 ± 22.81 |
| Sabinene | P < 0.001 | 141.94 ± 17.74 | 7.12 ± 2.17 |
| α-Terpinene | P < 0.001 | 15.39 ± 2.95 | 0.00 ± 0.00 |
| γ-Terpinene | P < 0.001 | 23.81 ± 5.42 | 0.00 ± 0.00 |
| Terpineol | P < 0.001 | 53.64 ± 8.55 | 16.50 ± 6.59 |
| Terpinolene | P < 0.001 | 352.79 ± 48.44 | 47.07 ± 13.04 |
| α-Thujone | P = 0.122 | 2.25 ± 0.84 | 1.85 ± 1.20 |
| Total | P < 0.001 | 15144.92 ± 1463.47 | 3881.44 ± 395.26 |

Significant differences were found in constitutive levels of resin terpenes between the two species of lodgepole pine and jack pine. Phloem samples from each tree were processed for comparison of induced levels of monoterpenes and for analysis of enantiomeric composition. Data on nine monoterpenes (3-carene, limonene, linalool, myrcene, β-phellandrene, α-pinene, β-pinene, pulegone, terpinolene) and the total of all of the 26 terpenes measured were analyzed. See "Comparison of lodgepole and jack pine resin chemistry: implications for range expansion by the mountain pine beetle, *Dendroctonus ponderosae* (Coleoptera: Curculionidae)" Erin L. Clark, Published Feb. 11, 2014, Pubed 24688833. This study pointed out clear differences, and certain similarities among the resin of related pine.

Without limiting the invention to this concept, it is believed that the specific make up of constitutive resin chemistry may play a part in the remediating application. Lower levels of alpha-pinene and higher levels of 3-carene in lodge pole pine as compared to jack pine is expected to play a role in remediation. The relative amounts of these terpenes are dictated to a degree by environmental pressures, e.g., altitude, temperature, insect infestation. Further, differences between Jack pine and lodge pole pine in wounding-induced phloem accumulation of five major terpenes were also found. Finally, for all but three of the 26 monoterpenes considered, lodgepole pine had higher levels of 20 of the 23 terpenes with the exceptions of linalool, pulegone, and alpha pinene. Total terpenes were also higher in lodgepole pine than in its cousin, jack pine. These differences in resin chemistry are believed to contribute to the effect of the Remediating Composition. It is hypothesized that the relative volume or content of certain resins may cause synergism or catalytic effects during remediation and, therefore, it is preferred, but not necessarily required, that the combination of resins as found in the tree be employed in the process described herein. It is also possible that the tree's sap composition at the time of harvest may contribute to the Remediating Composition's efficacy. While lodgepole pine is preferred for use in the present invention, other pine such as jack pine or mixtures of pine may exhibit similar effects when employed in a Remediating Composition as described herein.

In order to make the Remediating Composition of the present invention, a lodgepole pine, preferably live or within about two years after the tree's death, is processed. The typical stripping process before pelletizing can only remove so much off the exterior of the lodgepole tree. It is noted that at least some exterior limbs containing pine needles and an amount of tree bark remain after the stripping process and, therefore, are processed in the present invention with the trunk. Because the resin and sap in the wood material are believed to contribute to the invention's characteristics, it is possible that harvesting the trees at certain times of the year may yield material more effective for Remediating Composition than at others. Determining the more preferred time of year to harvest at certain latitudes would be within the ordinary skill in the art. The tree material comprising resin, and which may include some amount of bark and pine needles, is then ground. The size of the ground material can be selected in accordance with the intended use. Particles may be flakes, nuggets, or another form similar to other products on the market that are used to absorb and clean up spills of liquid or semi-liquid materials. Once ground, flaked, or pelletized the material is heat-dried. The temperature may be selected based on the size of the particles, typically between 450 and 700 degrees Fahrenheit while tumbling to a moisture content of about 15%, generally avoiding charring and flaming. The moisture content of the finished composition is not critical, give or take a few percent. While it is preferable that charring and flaming are avoided in order to preserve the resin chemistry, minor charring and/or flaming of some of the material does not markedly reduce the efficacy of the whole of the Remediating Composition. In general, the heat-dried process requires a short time, somewhat dependent on the size of the equipment employed. It is not unusual to reach the desired moisture range by heat-drying for 3-5 minutes. It is believed that efficient heat drying without over exposure to heat preserves the efficacy of the Remediating Composition.

In a preferred embodiment certain resins are predominant in relative volume. These levels are not required for the material to be effective, although it is thought these levels foster higher levels of effectiveness in remediation. It is believed that the relative volume or content of certain resins cause either synergism or catalytic effects during remediation and, therefore, it is preferred, but not necessarily required that the combination of resins be employed as found in the tree, without alteration other than as may result from the treatment described herein.

The invention encompasses methods to absorb, adsorb and/or otherwise reduce to safe levels certain contaminants in a contaminated material, said methods comprise mixing a contaminated material with an amount of the inventive Remediating Composition. Adequate contact may include a layer of the Remediating Composition to fully cover the contaminated object or its surface. If the contaminated material is fungible, and thorough mixing will not increase the hazard more than reasonably tolerated, the Remediating Composition and the contaminated material should be thoroughly mixed for best results. Additional, periodic mixing may also be helpful. Upon mixing the Remediating Composition with a liquid or semi-liquid to be remediated, there is, most often, an exothermic reaction. It is theorized that the exothermic reaction is a result of friction created by expansion of the inventive remediating material opening the cellulosic fiber which, in turn, encapsulates the contaminant.

Various analyses of the Remediating Composition have been performed. Specifically, the composition has been tested, for example, with oil and with lead.

Case Study #1 Oil Contaminated from Car Dealer: An amount of the Remediating Composition was provided to demonstrate and evaluate its remediation capabilities of oil-contaminated soil. The hydration, mixing, sampling, and laboratory testing results were performed by a qualified laboratory. Tests performed were not only to study remediation but also to evaluate leaching and were also performed according to EPA Method 8015B. The test results showed that the Remediating Composition removes diesel range organics (DRO). The results provide an indication of the ability of the Remediating Composition to retain absorbed petroleum hydrocarbons that would otherwise remain in the environment.

Results also indicate that Remediating Composition interaction with contaminated oil is critical. Visually, the product did not appear to have reached oil saturation during the tests. It may be inferred that some of the hydrocarbons extracted were from oil that did not receive complete mixing.

Case Study #2 Lead: Sample contaminated soil was collected from a shooting range. Residual lead pellets were removed from the soil. The base soil was analyzed for total lead employing EPA Method 6010, Preparation Method EPA 3050.

Test samples of the base soil were prepared, weighing one half pound. Next, portions of dehydrated Product were weighed. Test samples contained equal amounts of Product and lead-contaminated soil. The Product was allowed to hydrate for approximately two minutes before being mixed with the contaminated soil. After two minutes of mixing the Remediating Composition with the contaminated soil, samples of the treated soil were sent out for laboratory analysis.

Data collected clearly showed that the Remediating Composition effectively removes a significant portion of lead contamination from soil. Experiments conducted since these tests indicate that if the hydration water was introduced into the mixture (soil washing), a greater lead removal level is expected to the soil.

Generally, the Remediating Composition of the present invention works through contact. The Remediating Composition (or Product) is mixed with contaminated material (hereafter, "Mixture"). The mixture is allowed to remain in contact for a time period. Generally, though, remediation by the Remediating Composition of the present invention is not as time based as it is based on amount of Remediating Composition used relative to the amount of material to be remediated. As a general rule of thumb, but not for the purpose of limitation, where the Remediating Composition and the Contaminated Material is mixed in a ratio of about 1 to about 1, substantially complete remediation of the Contaminated Material can be expected in about 4 to about 12 hours; in a ratio of about 2 to about 1, substantially complete remediation of most of the Contaminated material can be expected to be remediated in about 2 to about 4 hours; and in a ratio of about 3 to about 1, remediation of most of the contaminated material can be expected in about 1 to 2 hours. Further, when the combined Remediating Composition and Contaminated Material is left in-situ, it will continue to remediate indefinitely. The contamination remedied in this manner does not re-appear.

Where measurement and testing facilities and turn-around makes it possible, remediation efforts should include periodic remixing followed by testing, and, perhaps, addition of more Remediating Composition followed by testing until the level of the subject contaminant or contaminants is reduced to below toxic levels, or to levels permissible for either regular or controlled disposal.

To remediate a contaminated material in liquid form, it is recommended to mix about 1 part Contaminated Material and 1 part combined Remediating Composition/hydration. After 2 hours of contact in the mixture, retesting is recommended to measure contamination levels. Remediation is declared when the amount of contaminant detected is either undetectable or meets an outside standard. More Remediating Composition may be needed to reduce the contamination that remains to a level that complies with EPA (or other) standards. If needed, additional Remediating Composition may be mixed in, and additional time allowed. This routine may be repeated until the combination of Contaminated Material and Remediating Composition complies with the applicable EPA or other standard.

Contaminants addressed by the present invention are many. Some of the more important materials that may be remediated by the present invention include oily material. One example of using the inventive Remediating Composition comprised remediation of 5780 mg/kg TPH-GRO (C6-C10 volatile petroleum hydrocarbons) and 404000 mg/kg TPH-DRO (C10-C28 extractable Petroleum Hydrocarbons) by mixing the material combination in a 1:1 ratio by mass with the Remediating Composition. Testing thereafter showed TPH-GRO (volatile hydrocarbons) was reduced to 504 mg/kg (about 9% of the pretesting concentration) and TPH-DRO (extractable hydrocarbons) was decreased to 55900 mg/kg (about 14% of the pretesting concentration). These reductions in concentrations were clearly not the result of simple dilution. Additional trials showed similar results.

Generally, the approach for use of the inventive remediating material with fungible materials just described is similar to the use of the remediating material with liquids and with liquid/solid mixtures. However, because of the liquid phase in the liquid/solid mixtures, remediating material should be added slowly, with continual mixing and sequential testing. It is possible that remediation of some liquids will occur relatively quickly. Slow addition with periodic testing may, then, provide a more economical approach.

What is claimed is:

1. A method of remediating a contaminated material having at least one contaminant, said method comprising:
    providing a remediating product comprised of cellulose fibers from a cellulose based material having resin, the remediating product being prepared using a heat drying operation between 450 and 700 F to reduce moisture content while avoiding charring and flaming of the remediating product;
    hydrating the remediating product; and
    contacting the hydrated remediating product with the contaminated material to remediate the contaminated material, wherein the heat drying operation between 450 and 700 F is performed for about three to five minutes to avoid the charring and the flaming of the remediation product.

2. The method of claim 1, wherein the at least one contaminant comprises includes at least one of a source of gasoline range organics, a source of diesel range organics, a source of oil range organics, and heavy metals, wherein said contacting comprises a period of time after which an amount of each the at least one contaminant in the contaminated material is remediated to an amount less than a predetermined amount.

3. The method of claim 1, wherein the at least one contaminated includes soil.

4. The method of claim 1, wherein the at least one contaminant includes at least one of oil, heavy metals, biomedical waste, and pesticides.

5. The method of claim 1, wherein remediating product is derived from ground lodgepole pine that is heat dried before use and the ratio of remediating product to the contaminated material is between about 1:1 and about 3:1.

6. The method of claim 1, wherein contacting the contaminated material with the hydrated remediating product forms a mixture, wherein the ratio of the hydrated remediating product added to the contaminated material is between about 1:1 and 5:1, wherein the contaminated material comprises any one or more of Arsenic, Barium, Cadmium, Chromium, Lead, Selenium, Silver, Mercury, Sodium, Magnesium, and Calcium.

7. The method of claim 6, wherein the contaminated material may further comprise any one or a mixture of: particulate matter comprising one or more of soil and ground materials, one or more liquids comprising polluted water, soft surfaces, and hard surfaces.

8. The method of claim 1, wherein the contaminated material includes total petroleum hydrocarbons-gas range organics.

9. The method of claim 8, wherein the hydrated remediating product and the contaminated material remain in contact until a level of TPH-GRO in the contaminated material is reduced by more than 50%.

10. The method of claim 8, wherein said material further comprises TPH-DRO, wherein the hydrated remediating product is mixed with the contaminated material in a mass ratio of between about 1:1 and 3:1, remaining in contact for at least twenty minutes reducing TPH-GRO by more than 50% and reducing TPH-DRO by more than 50%.

11. The method of claim 8, wherein upon contacting for a time period of at least 5 minutes the contaminant cannot be physically separated from the remediating product.

12. The method of claim 8, wherein the contaminated material is mixed in a 1:1 ratio by mass with the hydrated remediating product to form a mixture, said method resulting in a mixture having both less TPH-GRO and less TPH-DRO than was present in the contaminated material.

13. The method of claim 8, wherein TPH-GRO is reduced by more than 80% and TPH-DRO is reduced by more than 80%.

14. The method of claim 1, wherein the remediating product is derived from ground pine that is heat dried before use.

15. The method of claim 14, wherein the pine is at least one of jack pine and lodge pole pine.

16. The method of claim 1, wherein the remediating product is derived from a wood based cellulose material that is ground and dried before use.

17. The method of claim 16, wherein the wood based cellulose material was obtained from one of a live tree and a tree that has been dead less than two years.

18. The method of claim 17, wherein the remediating product is comprised of ground, flaked, or pelletized wood.

19. The method of claim 18, wherein a moisture content of the remediating product is about 15 percent.

20. The method of claim 19, wherein hydrating the remediating product occurs over a time period of about two minutes.

* * * * *